United States Patent

Buxton et al.

[15] 3,646,606

[45] Feb. 29, 1972

[54] PHYSIOLOGICAL MONITORING SYSTEM

[72] Inventors: Richard L. Buxton; George N. Miller, both of Huntsville, Ala.

[73] Assignee: Care Electronics, Inc.

[22] Filed: Aug. 6, 1969

[21] Appl. No.: 847,946

[52] U.S. Cl. ................... 128/2.06 R, 128/2.05 A, 128/2.1 A
[51] Int. Cl. ......................................................... A61b 5/04
[58] Field of Search ............ 128/2 R, 2.05 M, 2.05 A, 2.06 R, 128/2.1 A, 2.1 R

[56] References Cited

UNITED STATES PATENTS

| | | | |
|---|---|---|---|
| 3,149,628 | 9/1964 | Bolie | 128/2.05 M |
| 3,210,747 | 10/1965 | Clynes | 128/2.1 A |
| 3,253,588 | 5/1966 | Vuilleumier et al. | 128/2.1 A |
| 3,434,151 | 3/1969 | Badev et al | 128/2.06 R |
| 3,465,103 | 9/1969 | Lynch | 128/2.1 A |

OTHER PUBLICATIONS

Geddes et al. " American Journal of Medical Electronics" Jan- Mar. 1962, pp. 62- 69.
Kahn et al. " American Journal of Medical Electronics," Apr.- Jan. 1963, pp. 152- 157.

*Primary Examiner*—William E. Kamm
*Attorney*—C. A. Phillips

[57] ABSTRACT

A physiological monitoring system for hospitalized patients wherein each of the patients monitored would be provided a patient monitoring unit which would electrically sense two or more physiological conditions, translate desired information into digital form and transmit it by pulse coded FM radio link to a central monitoring station. The central monitoring station would receive transmitted information from one or more patients so equipped and detect and display the information in analog and digital form and in some instances provide automatic alarms on the occurrence of certain predetermined values for the sensed conditions.

3 Claims, 4 Drawing Figures

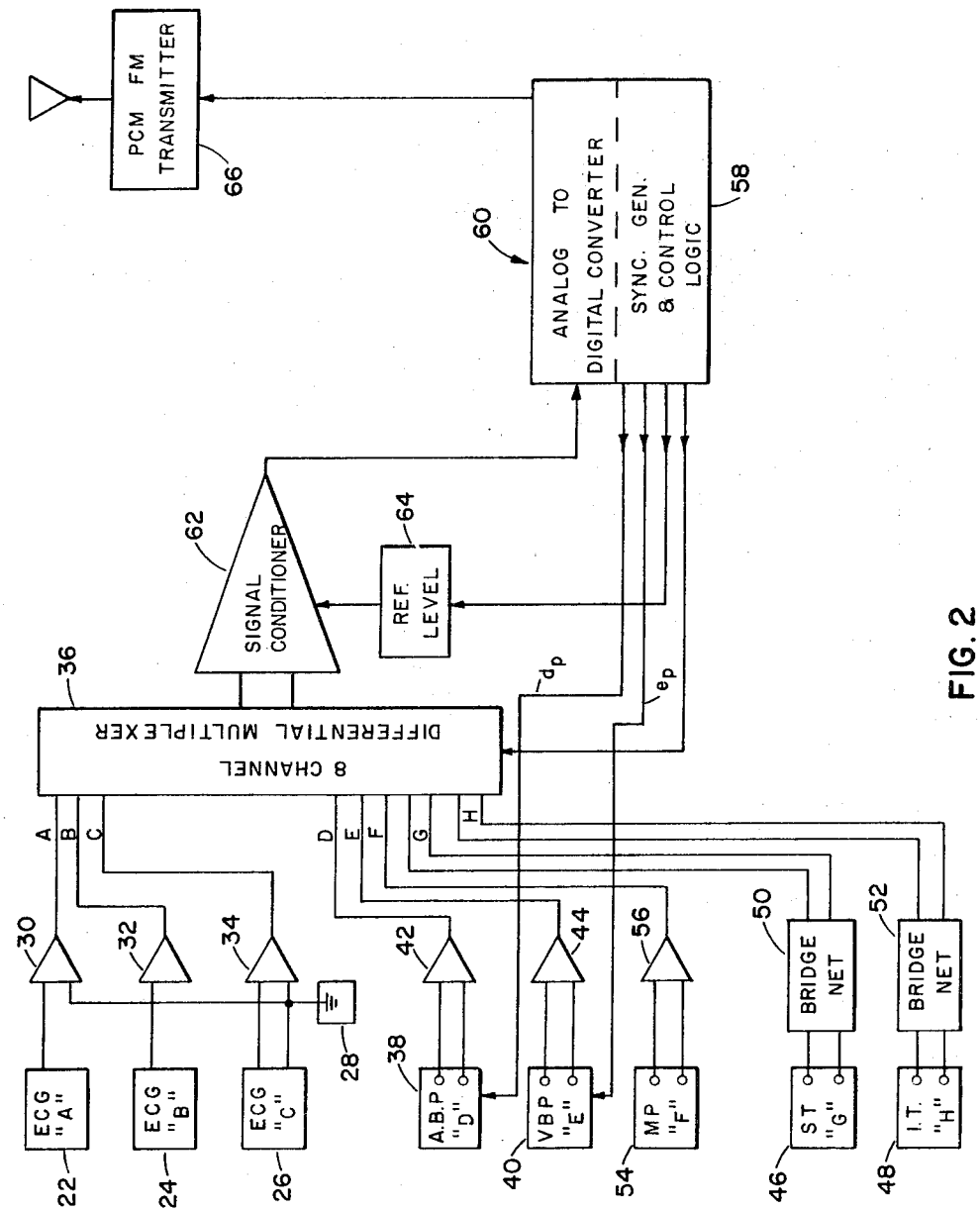
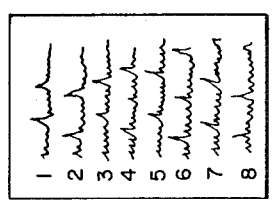
FIG. 4
FIG. 2
Richard L. Buxton
George N. Miller,
INVENTORS
BY
C. A. Phillips
ATTORNEY Richard L. Buxton
George N. Miller,
INVENTORS.

C. A. Phillips
ATTORNEY

PHYSIOLOGICAL MONITORING SYSTEM

This invention relates to measurement systems and particularly to a system for the measurement and display of physiological conditions.

Equipment for the measurement of physiological conditions by electrical sensing means has been developed to the point where extremely valuable measurements can be obtained of such things as, for example, cardiac condition, blood pressure and temperature. However, a number of problems exist with respect to existing apparatus, particularly in the area of interface between measurement equipment and the medical observer who must, with a high degree of efficiency, extract measured data and act on it. A further problem area lies in presently used means for communicating data between the person of the patient and the data readout equipment.

Accordingly, it is a primary object of this invention to bridge the gap between the art of raw measurement of physiological conditions and the normal abilities and frailities of persons charged with the responsibility of continuously monitoring the physiological conditions of a patient or, in most cases, several patients, and to provide an overall system wherein the critical interface between a patient's condition and the monitoring doctor or nurse is much more effectively and efficiently achieved than heretofore.

It is a further object of this invention to provide for centralized or remote monitoring of conditions of a number of patients without the necessity of wire linkage between the patients and the monitoring equipment; thus, freeing patients to move about without restraint and making unnecessary the substantial wiring that would be normally necessary to construct such a monitoring system.

It is a further object of this invention to provide a system of intensive care monitoring which does not require particular location of patients.

It is still a further object of this invention to provide the necessary communications link between a patient and central monitoring equipment by radio means capable of dependable operation in a hospital environment.

It is still another object of this invention to provide a patient measurement unit which may be operated with very low power consumption permitting relatively long periods of operation without the necessity of replacing battery power sources.

It is a still further object of this invention to provide for accurate data resolution by means of the use of a particular form of digitally encoded data.

In accordance with the invention, a plurality of patients, for example, eight patients, requiring intensive care are each equipped with a measurement unit which electrically measures several physiological conditions pertinent to the ailment of the patient, for example, heart condition, blood pressure and temperature. Electrical outputs from body probes providing these measurements are fed through preamplifiers to a commutator which provides a single continuous output signal made up of repeated, serially arranged, samplings of the individual sensed conditions. Next a signal conditioner, operating in synchronization with the commutator, selectively adjusts, as needed, the reference level of the now serially occurring physiological signals. After this, each physiological signal is translated into a digitally encoded word, which together with appropriate synchronization information, is transmitted by a pulse-coded modulated FM transmitter to a central monitor. The central monitor receives transmissions on separate frequency channels from each patient unit and translates the transmitted data variously to achieve accurate and optimumly presented reproductions of sensed physiological conditions. For example, heart and blood pressure data is translated into analog form and indicated by meter and cathode-ray display. Blood pressure and temperature data is translated into decimal form and directly presented as decimal quantities on digital displays. In addition, an E.C.G. signal is analyzed for overvoltage output and a preshock state indicated by a warning signal. Similarly, systolic and diastolic (high and low) arterial blood pressure excursions are detected and a warning signal given if there is a departure from preset values. Diastolic and systolic blood pressure values are also presented in decimal form by gating a decimal readout, to display and hold high and low blood pressure values.

These and other objects, features and advantages of the invention will be readily appreciated from the following description when considered together with the accompanying drawings in which:

FIG. 2 is an electrical schematic circuit diagram of a patient worn unit of this invention;

FIG. 4 is a view along the lines 4—4 of FIG. 3 illustrating the cathode-ray tube presentation provided by the circuit of FIG. 2.

Figure 1:
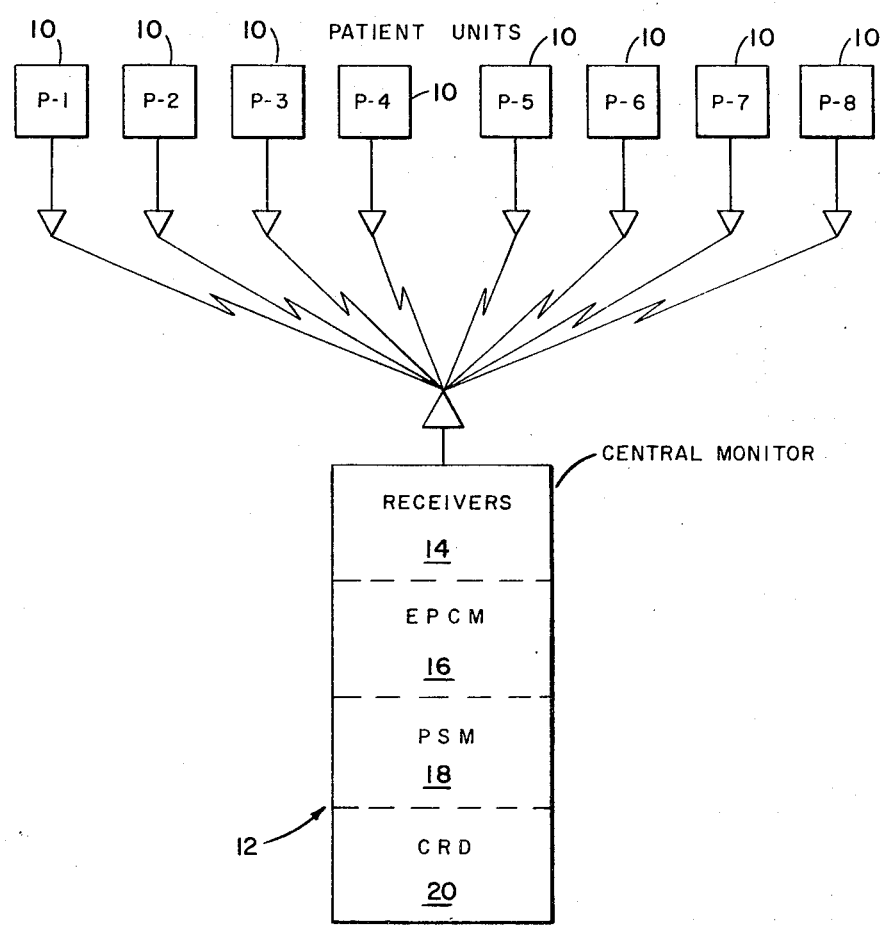
FIG. 1 is a schematic illustration of the overall system of the invention.

FIG. 1 generally illustrates the system of the invention as applied to an intensive care application in which eight patients are monitored by a single medical observer. Each patient is equipped with a patient measurement unit 10, designated P1–P8. The patients may be in separate rooms, making unnecessary a special location for patients requiring intensive care. Central monitoring unit 12 is functionally divided, in general, into Receiver Section 14, "Every Patient Continuous Monitoring" (EPCM) section 16, "Patient Selective Monitoring" (PSM), section 18 and Cathode-Ray Display (CRD), section 20. In the "Every Patient Continuous Monitoring" section there is continuous monitoring of systolic blood pressure, heart rate and continuous monitoring for preshock indications. There is also selectable continuous monitoring of any one of several conditions.

FIG. 2 generally illustrates the circuit arrangement of patient unit 10. ECG, electrocardogram, electrodes 22, 24 and 26 together with ground or reference electrode 28 are appropriately positioned in contact with a patient and function to pick up electrical potentials or signals generated by the heart. These signals, labeled A, B and C, respectively, are amplified in preamplifiers 30, 32 and 34, respectively, and applied to separate channels of eight channel multiplexer 36.

Arterial and veinal blood pressure transducers 38 and 40 sense blood pressure and provide through preamplifiers 42 and 44 blood pressure signals labeled D and E to separate channel inputs of multiplexer 36.

Temperature of a patient is typically sensed by both a skin temperature probe 46 and internal temperature probe 48 in conjunction with bridge networks 50 and 52, respectively, and the resulting signal outputs fed as inputs G and H to separate channels of multiplexer 36. As an auxiliary or reserve function channel, any appropriate transducer 54 may be employed together with any appropriate signal conditioning device 56 and applied as an auxiliary input F to multiplexer 36. For simplicity of designation, the channels of multiplexer 36 are also referred to as A–H in accordance with the signal designations.

Multiplexer 36 functions to sample each of the input channels sequentially at a rate which provides for each channel to be sampled for a period of 250 microseconds permitting sampling of all eight channels in a period of 2,000 microseconds, a sampling rate of 500 times per second. Multiplexer 36 is driven or controlled by gating pulses generated by sync generator and logic control 58 of analog-to-digital converter 60. The time shared outputs of multiplexer 36 are in differential signal form and are fed to signal conditioner 62. The function of signal conditioner 62 is to properly scale the various types of signal information applied to it for analog-to-digital conversion. For example, the three ECG signals are referenced at 2½ volts, that is with no signal provided by transducers 22, 24 or 26, the conditioned signals have a value of 2½ volts. The same reference is applied to the auxiliary or multipurpose open channel F. The blood pressure channels are referenced at 0, that is with a 0 input on blood pressure channels F and E, the output of signal conditioner 62 is also zero. Similarly, the temperature channels G and H are referenced with respect to 0 and no biasing, or addition of bias is effected. Conditioning is achieved by applying from reference level circuit 64 to signal conditioner 62 a reference voltage of 2½ volts, or other appropriate level, during and only during the required periods, that is during the periods channels A–C and F are being passed by multiplexer 36. At other times the reference voltage is held at zero. Reference level circuit 64 is controlled by an appropriate train of control pulses from sync generator and logic control 58 of analog-to-digital converter 60 to accomplish synchronized application of reference voltages.

The output of signal conditioner 62 is fed to analog-to-digital converter 60 which converts the Pulse Amplitude Modulated (PAM) output of signal conditioner 62 to digital form, having for example, a maximum scale output of 5.1 volts. A 10-bit digital word system is used in which the first eight bits are representative of the converted analog information and the last two bits accomplish word and frame identification, respectively. The duration of a bit determines the presence or absence of a coded or weighted digit, with a bit of 6 microsecond duration representing a "0" and a bit of 18 microseconds representing a "1." The end of a word is marked by a 12 microsecond pulse in the ninth bit position, and the presence of a 12 microsecond pulse in both the ninth and 10th bit positions mark the end of a frame. A word corresponds to one sampling of the amplitude of one of the physiological conditions being sampled and a frame correspond to one complete set of words or set of samplings of the physiological conditions being monitored.

The output of analog-to-digital converter 60 is applied to and pulse code modulates FM transmitter 66. The presence of a 6 microsecond pulse shifts the carrier about 100 kHz., a 12 microsecond pulse shifts it about 100 kHz. and a 18 microsecond pulse shifts the carrier about 100 kHz. Typically, the carrier frequency of a transmitter 66 would be in the FM broadcast range of 88 to 108 MHz. By the use of pulse code width modulation, extremely accurate and dependable intrahospital communications are achieved despite the presence of substantial radiation from other equipment such as X-ray and diathermy machines.

Blood pressure transducers 38 and 40 typically require an operating bias current of approximately 10 ma. each and as a feature of this invention the operating bias is keyed on only during the periods when channels D and E are gated open by keying pulses $d_p$ and $e_p$, respectively, from multiplexer 36 by switching means integral with probe, or probe assemblies 38 and 40. Thus operating power is applied to each of transducers 38 and 40 for one-eighth of the time normally required, thus significantly reducing the overall operating power requirements for a patient unit. In fact, the reduction is approximately 40 percent.

Figure 3:
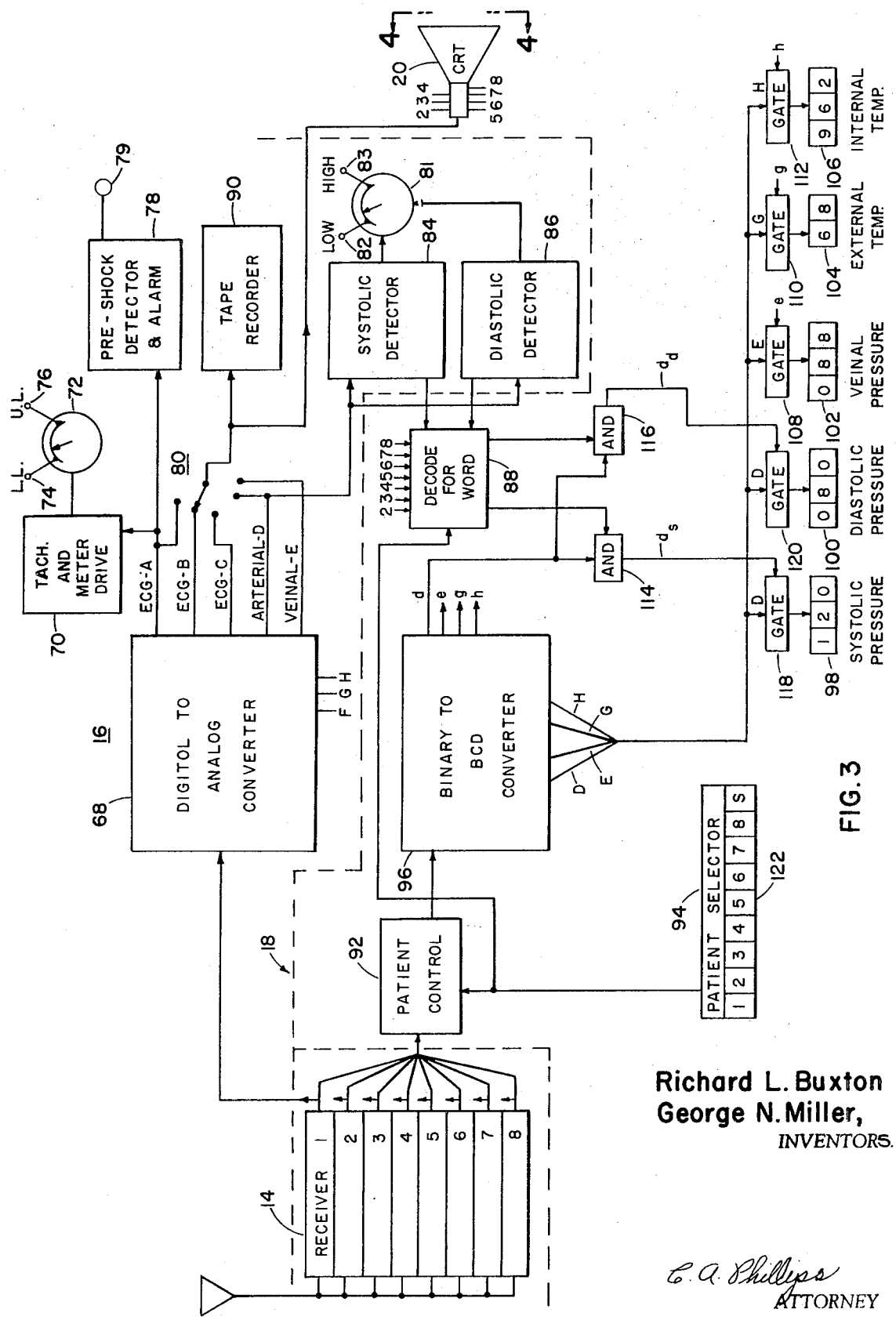
FIG. 3 is an electrical schematic circuit diagram of the central monitoring unit of this invention.

FIG. 3 shows the circuit arrangement of central monitor 12. As stated above, it is basically divided between Radio Receiving Section 14, "Every Patient Continuous Monitoring" Section 16, "Patients Selective Section" 18 and Cathode-Ray Display 20. Radio receiving section 14 consists of eight radio receivers, each tuned to the frequency channel of a like designated patient unit (FIG. 1). It has been determined that clear FM broadcast channels (for the particular locale) provide excellent communication channels with very low power. Each "Every Patient Continuous Monitoring" Section 16 receives an appropriate receiver output which is applied to a digital-to-analog converter 68. The one shown is responsive to receiver No. 1 and processes data from patient 1. Here the digitally coded data from a transmitter 66, and received by Receiver No. 1, is converted to analog form and the output of each data channel is appropriately sampled, held between samples and filtered to reproduce the original measurements. As shown, five of the measurements are utilized in this section, ECG-A, ECG-B, ECG-C, arterial blood pressure D and indirect blood pressure E (which could be used for other data). The other measurement channels F, G, and H are available as needed for analog analysis. One of the ECG signals, ECG-A, is applied to tachometer and meter driver 70 and thence to counts-per-minute meter 72 for direct readout of heart rate. Meter 72 also includes upper and lower limits which power, respectively, upper and lower limit alarm lights 74 and 76. This permits the preset of critical limits for a given patient as determined by his doctor and thus provides selective critical care for that patient. As a still further aid to the detection of a dangerous change in heart condition, a heart signal output, such as from ECG-A, is fed to preshock detector and alarm 78, which detects the presence of higher than normal voltages and energizes alarm light 79.

Continuous visual observation of any one of a particular patient's condition as provided by any one of the outputs of digital-to-analog converter 68 is achieved by connecting the output to cathode-ray display 20 which has an allotted space slot for each patient as illustrated in FIG. 4. As shown in FIG. 3, switch 80 is arranged to selectively connect any one of outputs A–E to the patient No. 1 input of cathode-ray display 20.

In addition to the graphical display of blood pressure, outputs D and E of digital-to-analog converter 68, blood pressure is also indicated on meter 81 which includes adjustable upper systolic and lower systolic limit detection which energizes a low or high limit alarm, lights 82 or 83 as the case may be, if a preset value is passed. In addition, systolic detector and diastolic detectors 84 and 86 and which control meter 81 also provide an output in the form of an electrical pulse to "decode for word" stage 88 of patient selective monitoring section 18 indicating the time of occurrence of upper and lower peak values of blood pressure which indications are used to identify in time the appropriate digital word carrying a precise value for such high or low value. The operation of this portion of the system will be further discussed below.

As another mode of indicating selected outputs of digital-to-analog converter 68, recorder 90 may be connected to continuously record any one of these outputs.

Decimal readout of physiological conditions monitored by the system are controlled by patient control 92 responsive to patient selector 94, in Patient Selective Monitoring Section 18. For purposes of illustration, it will be assumed that patient No. 1 is selected. Patient control 92 then connects an output from receiver 1 to binary to binary coded decimal (BCO) converter 96 which, accordingly, provides as outputs D,E,G, and H decimally coded signals to like function decimal readouts, the D output being fed to both systolic and disastolic blood pressure readouts 98 and 100, respectively, the E output being fed to veinal blood pressure readout 102, the G output being fed to external temperature readout 104 and the H output being fed to internal temperature readout 106. In addition, gating pulses, $e, g$ and $h$ corresponding in time to the occurrence of like, but upper case, lettered data outputs are fed, respectively, to gates 108, 110 and 112 to provide data bits to decimal readouts 102, 104 and 106 only during the precise times in which the data is accurate as determined by binary to binary coded decimal converter 96. Precise readout of systolic and diastolic blood pressure requires an indication not only of the time of occurrence of an accurate bit of data, but also the time when blood pressure corresponds to a systolic or diastolic condition. Accordingly, "decode for word" circuit 88, a switching circuit, receives systolic and diastolic "when" pulses from systolic detector 84 and diastolic detector 86, respectively, and applies same appropriately to "AND"-gates 114 and 116. Gates 114 and 116 are also provided with word readout marking pulses "$d$" from binary to binary coded decimal converter 96. When coincident pulses are applied to one of the "AND" gates a gating pulse is applied to gates 118 or 120, as the case may be, and accurate decimal readout of systolic or diastolic blood pressure on readouts 98 or 100 obtained. Patient selection for "decode for words" circuit 88 is controlled by patient selector 94. Patient selector 94 also provides for automatic cycling of the decimal readouts. This is accomplished by selecting the "$s$" condition on selector 94 which then causes the system to decimally readout in sequence data derived from each patient. Indication of the particular patient being observed is provided by illumination of numbers 122, a light for a particular number being energized during the period in which data from a corresponding patient is being read out.

The operation of this system has been generally described above. Patient units 10 and accompanying probes are initially placed on and with respect to each patient. Data from each patient is then transmitted via a pulse code modulated FM link between patient units 10 and receiving section 14 of central monitor 12. An output from each receiver is applied to the corresponding analog section 16. The operator of the central control monitor visually scans periodically the traces on cathode-ray display 12 corresponding to the physiological functions of each patient. The operator particularly selects between physiological signals to be observed by selector switch 80. The operator also observes heart rate on meter 72 and systolic and diastolic blood pressure on meters 81. Dangerous blood pressure excursions are indicated by preset warning lights 82 and 83 and a preshock condition by alarm 78. When desired, as for example, when there is an indication of progressive changes in a patient, particular functions may be recorded on tape recorder 90.

The operator may also selectively observe decimal readouts for precise determination of blood pressure, including systolic and diastolic blood pressure, for any patient. In addition, both external and internal temperature are made decimally available for examination.

In summary, by means of reasonable attention and selection a single operator is able to provide intensive and extensive observation of a number of patients, a feat not previously possible. It is therefore concluded that the inventors have provided a new and novel system for more complete patient care, and with substantially less personnel effort than heretofore possible.

What is claimed as our invention is:

1. A physiological monitoring system for remotely monitoring a plurality of physiological conditions of at least one hospitalized patient comprising:
   A. At least one patient unit for sensing a plurality of physiological conditions and providing electrical signals representative thereof, each said circuit including at least one heart sensor, at least one blood pressure sensor, and at least one temperature sensor and further including:
      1. commutation means having an input channel for each sensed condition and being responsive to said signals for providing a serial output consisting of repeated sequential samplings of said signals,
      2. signal conditioning means responsive to the output of and operating in synchronization with said commutation means for selectively adjusting the reference level of the now serially arranged signals,
      3. analog-to-digital translation means responsive to said signal conditioning means for providing a digitally encoded word signal for each sample of a given physiological signal and for providing a signal indicating the completion of single word and the completion of a set of words; and
      4. radio transmission means for transmitting said encoded word signals by a pulse-code, frequency-modulated radio frequency carrier;
   B. A central monitor for indicating physiological conditions from at least one said patient unit and including:
      1. receiving means including a radio receiver for each patient unit for receiving a radio signal from a said patient unit,
      2. digital-to-analog conversion means responsive to an output from each said receiver for providing analog outputs including at least one heart responsive signal and at least one blood pressure responsive signal,
      3. cathode-ray tube means for selectively displaying at least one heart responsive signal and at least one blood pressure responsive signal from each patient monitored,
      4. heart rate means responsive to a said heart responsive signal of a patient for indicating the rate of heart beat of that patient,
      5. preshock detection means responsive to the amplitude of a said heart responsive signal for indicating the presence of overvoltage signals and a preshock condition,
      6. systolic detection and indicating means responsive to a blood pressure signal output of said digital-to-analog converter for detecting and indicating maximum values of blood pressure,
      7. diastolic detection and indicating means responsive to a blood pressure signal output of said digital-to-analog converter for detecting and indicating minimum values of blood pressure,
      8. binary to binary coded decimal conversion means responsive to a selected said receiving means for providing a first plurality of outputs wherein at least one output is a decimally coded temperature signal, and for providing a second plurality of outputs wherein at least one output is a signal marking the period of accurate readout of blood pressure signal and at least one said output is a signal marking the period of accurate readout of a said temperature signal,
      9. decimally indicated systolic blood pressure indicating means comprising:
         a. first systolic gating means responsive to the coincidence of an output from said systolic detection means marking the period of occurrence of a systolic condition and said output from said binary to binary coded decimal conversion means marking the period of accurate readout of a said blood pressure signal for providing a systolic occurrence gating signal,
         b. systolic decimal readout means,
         c. second systolic gating means responsive to an output of said first systolic gating means and a said decimally coded blood pressure signal from said binary to binary coded decimal conversion means for providing a systolic blood pressure digitally encoded signal to said systolic decimal readout means,
      10. decimally indicated diastolic blood pressure indicating means comprising:
         a. first diastolic gating means responsive to the coincidence of an output from said diastolic detection means marking the period of occurrence of a diastolic condition and a said output from said binary to binary coded decimal conversion means marking the period of accurate readout of a said blood pressure signal for providing a diastolic occurrence gating signal,
         b. diastolic decimal readout means,
         c. second diastolic gating means responsive to an output of said first diastolic gating means and a said decimally coded blood pressure signal from said binary to binary coded decimal conversion means for providing a diastolic blood pressure digitally encoded signal to said diastolic decimal readout means,
      11. at least one digital temperature readout means, and
      12. gating means responsive to a said decimally coded temperature signal and a signal marking the period of accurate readout of said temperature signal for providing a digitally coded signal to said digital temperature readout means.

2. A physiological monitoring system as set forth in claim 1 wherein at least one said blood pressure sensor requires an applied operating bias and said system further comprises means for providing said operating bias only during the periods in which the output of said blood pressure sensor is being passed through said commutating means.

3. A physiological monitoring system as set forth in claim 1 wherein said central monitor further comprises recording means for selectively recording at least one said signal.

* * * * *